Figure 1:
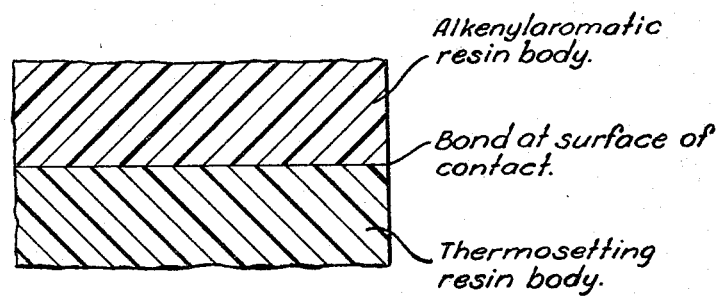

3,051,597
BONDING THERMOSETTING RESINS TO
POLYSTYRENE PLASTICS
Lloyd B. Bushong, Bay City, and Robert N. Kennedy and Paul H. Lipke, Midland, Mich., assignors to The Dow Chemical Company, Midland, Mich., a corporation of Delaware
Filed June 21, 1956, Ser. No. 592,768
11 Claims. (Cl. 154—43)

This invention relates to the practice of bonding thermosetting resin compositions to polystyrene plastics. It particularly pertains to an improvement in the making of composite structures wherein a surface of certain kinds of solid polymers of alkenylaromatic compounds such as styrene is flame-treated to modify such surface, a reactable resin compositon is applied to the treated surface and is cured in contact with such surfaces, whereby the alkenylaromatic compound polymer and the cured resin composition are bonded together.

In the art of making composite structures wherein it is desired to bond together at a surface of contact a polystyrene-type composition and a thermoset resin composition, difficulties have been encountered in obtaining satisfactory adherence of the diverse compositions at such surface of contact, particularly when the structures are fabricated from a solid polystyrene-type plastic having a smooth, regular surface that affords no means for mechanical interlocking with the thermoset resin composition. The nature of this problem can be illustrated by taking two flat pieces of a molded polystyrene-type plastic, coating a surface of at least one of such pieces with a curable epoxy resin adhesive composition, pressing the polystyrene-type plastic pieces together with the curable epoxy resin adhesive therebetween, and curing the epoxy resin composition. There results a composite structure having a polystyrene-type plastic joined to a thermoset resin at a surface of contact. However, the bond between these diverse materials is very weak, and the pieces of polystyrene-type plastic can easily be pulled apart, failure occurring at a surface of contact between the polystyrene-type plastic and the cured thermoset resin.

It is an object of this invention to provide composite structures having a solid alkenylaromatic polymer composition and a solid thermoset resin composition strongly bonded together at a surface of contact.

A particular object is to prepare such structures from solid polymers of alkenylaromatic compounds and reactable resin-forming compositions.

A still more specific object is to prepare such structures by modifying the surface characteristics of a solid alkenylaromatic compound polymer, applying thereto an uncured curable thermosetting resin-forming composition, and curing such resin composition.

Other objects and advantages of the invention will be evident in the following description.

The objects of this invention have been attained in a novel method of making composite structures wherein solid resinous plastics having a surface composed of certain kinds of alkenylaromatic resin polymers are contacted with an oxidizing flame, thereby modifying the plastic surface and rendering the same adherent to thermoset resins, applying to the flame-treated surface an uncured curable thermosetting resin-forming composition, and curing such resin-forming composition to obtain a novel composite structure having a thermoset resin securely bonded to the solid alkenylaromatic resin polymer at a surface of contact.

The invention is advantageously useful in providing articles that comprise composite structures having a solid thermoset resin securely bonded to certain solid alkenylaromatic polymers at a surface of contact.

FIG. 1 of the drawing represents a sectional view of a portion of a composite article showing a thermosetting resin body bonded at a surface of contact to a solid alkenylaromatic resin body.

Figure 2:
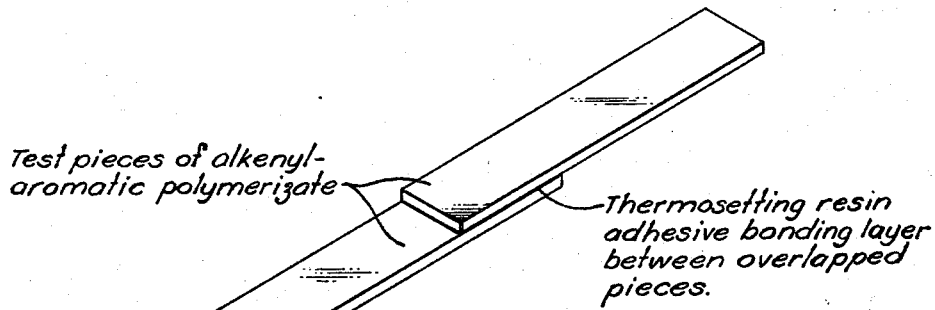

FIG. 2 of the drawing represents a perspective view of a test article prepared and described in an example of the invention.

The invention is advantageously practiced with solid resin polymers that comprise styrene and/or a homologue and/or analogue thereof and a non-styrene ingredient such as a conjugated aliphatic diene or an ethylenically unsaturated polymerizable nitrile in chemically combined form. More specifically, the starting solid resin polymer is a copolymer, interpolymer or blended mechanical mixture of polymeric materials, and comprises in chemically combined form a major proportion of at least one alkenylaromatic compound such as styrene, $\alpha$-methylstyrene, o-methylstyrene, m-methylstyrene, p-methylstyrene, $\alpha$,ar-dimethylstyrene, ar,ar-dimethylstyrene, ar-ethylstyrene, or ar-alkoxystyrene, and a minor but appreciable proportion of a polymerizable ethylenically unsaturated nitrile, such as acrylonitrile or methacrylonitrile, or a conjugated aliphatic diene such as 1,3-butadiene or isoprene; the latter can be in the form of polymers such as natural rubber, or copolymers such as butadiene-styrene copolymers or butadiene-acrylonitrile copolymers. Certain of these compositions and methods for their preparation are described in U.S. Patents 2,606,163, 2,683,127, and 2,694,692.

Specific examples of such alkenylaromatic resins are: a solid resinous product obtained by polymerization of styrene containing dispersed therein approximately 5 percent by weight of a butadiene-styrene copolymer rubber containing about 80 percent 1,3-butadiene and about 20 percent by weight styrene; a product obtained by mechanically blending 65 percent by weight of a resinous copolymer of about 75 percent styrene and 25 percent by weight of $\alpha$-methylstyrene with 35 percent by weight of a butadiene-styrene copolymer containing about 40 percent 1,3-butadiene and about 60 percent by weight styrene; and a resinous copolymer of 70 percent by weight styrene and 30 percent acrylonitrile. Other examples are resinous polymeric compositions of from 55 to 95 percent by weight styrene and from 5 to 45 percent of a natural diene rubber such as hevea rubber or synthetic diene rubbers or resins such as polymers of 1,3-butadiene, isoprene, piperylene, and/or 2,3-dimethyl-1,3-butadiene, especially copolymers of one or more of such conjugated dienes with styrene or acrylonitrile; similar compositions of styrene, $\alpha$-methylstyrene and diene rubbers or resins; and copolymers of from 55 to 98 percent of styrene and/or ar-methylstyrene and/or $\alpha$-methylstyrene and from 2 to 45 percent acrylonitrile and/or methacrylonitrile and/or butadiene. In their usual state as ordinarily made and used, the foregoing solid alkenylaromaitc resinous polymers are not adherent to thermosetting resin compositions. As described hereinafter, strong bonds can be obtained between these solid resins and thermosetting resin compositions by flame-treating the surface of solid alkenylaromatic resin polymers of the kinds just described.

Flame-treatment of the surface of homopolystyrene does not produce adhesiveness to thermosetting resins.

Suitable thermosetting resin compositions are known and are illustrated by the epoxy resins, the phenolic resins, the resorcinol resins and the urea resins. These materials are obtainable in an uncured but curable condition. In such uncured condition the resin-forming materials are liquid, semiliquid, pasty, buttery or soft-solid compositions that can be spread on solid surfaces or molded into conformity with a confining wall. These compositions are also capable of undergoing self-reaction or "curing" whereby they are converted to a hard, solid, "cured" or "set" stage. The uncured epoxy resin-forming compositions comprise epoxides, polyepoxides, epihalohydrins or epipolyhalohydrins and polyhydric alcohols or phenols such as polyglycols or bisphenols, and low molecular weight partial condensation products of these progenitors. A specific example of such a material comprises 4,4'-isopropylidene-bisphenol, epichlorohydrin, and low molecular weight partial condensation products thereof. The uncured epoxy resin-forming compositions in general are curable by the addition of curing agents such as polyhydric phenols, polybasic acids, aldehydes, polyamines, and polyamides; specific examples of such curing agents are diethylene triamine, triethylene tetramine and mixtures thereof. Resins of the kind just described are sometimes identified as ethoxyline resins or complex ethoxide resins. Other examples of uncured curable resin-forming compositions are ones comprising epichlorohydrin-resorcinol condensation products, epoxylated novolaks, first-stage condensation products of phenol and/or substituted phenols and/or resorcinol and formaldehyde and/or other aldehydes, and urea-aldehyde condensation products.

As stated hereinbefore, when attempt is made to prepare composite structures by curing one of these curable thermosetting resin-forming compositions in contact with one of the described solid alkenylaromatic resin polymers the bond between the diverse materials at the contacting surface is unsatisfactorily weak and too easily broken. It is a feature of the present invention that strong bonds are obtained between such materials when a surface of the solid alkenylaromatic resinous polymer as hereinbefore identified is first treated by contacting the same with an oxidizing flame, whereby the polymer surface is modified and rendered adherent to thermosetting resins.

Suitable oxidizing flames for the purposes of this invention are generated by burning in air a combustible gas or vapor, such as a carbonaceous fuel, preferably to provide one or more substantially steady tongues of flame that comprise an oxidizing zone. Such flames ordinarily generate heat in the order of 1500° to 2000° C. Common fuels such as natural or artificial gas, casinghead gas, gasoline, kerosene, fuel oil, paraffin, alcohol, water-gas and even hydrogen are suitable. Smoky flames should be avoided because these deposit soot and greasy films on the plastic surface. Clean flames, such as are obtained with Bunsen and similar burners that are adapted for burning gaseous fuels with proper carburetion, are preferred. The treatment of the polymer surface is effected by bringing such surface briefly into the oxidizing zone of such a flame or flames. Even momentary contact of the alkenylaromatic resin with the oxidizing flame increases the adhesiveness of the surface to thermosetting resins. The extent of the ffect of the flame treatment is roughly proportional to the flame temperature, flame size, and duration of contact. It is usually preferable to limit the flame treatment so that visible melting or softening of the alkenylaromatic resin surface does not occur. In most instances, the duration of contact of an incremental portion of the polymer surface with the oxidizing flame is in the order of approximately 0.5 second.

The surface of the solid alkenylaromatic polymer that has been flame-treated in the manner just described is not visibly different from the untreated surface. However, the surface so flame-treated is thereby rendered adherent to thermosetting resins. It is not yet fully understood what change has taken place in the treated surface that accounts for the superior bondability to thermosetting resins. It is known that the effect is permanent as respects aging, i.e. the ability of the flame-treated surface to result in a secure bond to thermosetting resins is not diminished on long storing of the flame-treated plastic prior to applying the resin-forming composition. It is also known that the plastic having a flame-treated surface can be heat-fabricated with considerable distortion of the treated surface without appreciable loss of bonding activity of such surface provided that the treated surface is not removed from the plastic mass or body. It is also known that the beneficial effects of the flame-treatment are lost by removing a thin layer of the plastic at the flame-treated surface, e.g. by scouring the flame-treated surface with an abrasive. It seems likely that contact of the plastic surface with the oxidizing flame results in formation of chemically reactive functional groups on the surface polymer molecules, which groups are not present in the untreated surface polymer molecules, but the invention is not dependent on this or any other theory.

To the flame-treated surface of solid alkenylaromatic resin polymers of the kinds hereinbefore identified is applied an uncured, curable resin-forming composition such as one of those hereinbefore described, e.g. a self-reactive mixture of an epoxy resin and a polyalkene polyamine curing agent, and the resin-forming composition is cured, whereby there is obtained a composite structure having a thermoset resin securely bonded to the alkenylaromatic resin polymer at the flame-treated contact surface.

The strongly-bonded composite structures provided by this invention can take many forms and many useful articles are obtainable thereby that are not obtainable or are not satisfactory when obtained in any other known way.

The thermosetting resin can be a coating composition applied to the alkenylaromatic resin body for protective, decorative or other purpose. In such instances the present invention provides useful articles having an alkenylaromatic resin base and a thermoset resin coating securely bonded thereto.

The thermosetting resin can be a part of a composite molded article of which another part is an alkenylaromatic resin plastic securely bonded thereto. Such composite articles are readily made by preforming the alkenylaromatic resin plastic part, flame-treating the surface thereof to be joined to the thermosetting resin in accordance with this invention, molding the uncured curable thermosetting resin composition against the flame-treated surface of the alkenylaromatic resin plastic part, and curing the thermosetting resin composition.

The thermosetting resin can be an adhesive bonding layer between proximate surfaces of solids to be joined, at least one of such surfaces being the flame-treated surface of an alkenylaromatic resinous plastic of the kind herein described. For example, commercial epoxy resin adhesives can now be successfully employed to bond these particular alkenylaromatic resin materials to each other or to another solid (provided such other solid itself is adherent to the epoxy resin adhesives) by first flame-treating the alkenylaromatic resin surface as herein described.

Recently, composite structures have been devised having a cellular, foamed mass and an outer non-foamed sheath or skin in which the outer, dense layer is an alkenylaromatic resin plastic of the kind herein described and the cellular mass is generated from a foamable composition comprising a self-reactive curable thermosetting resin-forming composition such as an epoxy resin-forming composition. According to the present invention, such composite structures having a strong and secure bond between the outer plastic layer and the foamed mass can be obtained by providing an alkenylaromatic plastic member having a flame-treated surface, applying to such surface the foamable composition comprising the self-reactive curable thermosetting resin-forming material and curing and foaming such composition in contact with the flame-treated surface.

Those skilled in the art will perceive and devise other ways in which this invention can advantageously be employed.

The following examples illustrate the invention but are not to be construed as limiting its scope.

EXAMPLE

A rubber-modified polystyrene interpolymer prepared in accordance with U.S. Patent 2,694,692 and containing about 5 percent by weight of a GR-S rubber (copolymer of about 80 percent by weight 1,3-butadiene and about 20 percent styrene) was fabricated into a sheet 0.040 inch thick. There were cut from this sheet test pieces ¾ inch by 6 inches.

The surface of some of these tests pieces was flame-treated by passing the test pieces through the oxidizing portion of a flame obtained by burning natural gas in a laboratory "Meeker" burner, the contact time of an incremental portion of the test piece in such flame being approximately 0.5 second. Under the conditions employed, the effect of the flame treatment could not be seen by visual comparison of the treated and untreated test pieces.

Composite test articles were constructed from the flame-treated test pieces and other such articles were constructed from untreated test pieces by bonding one test piece to another in overlapping relationship over a 2-inch portion of their lengths with a self-curing thermosetting resin-forming adhesive therebetween as shown in perspective view in FIG. 2 of the drawing. In each of these test articles, the test pieces from which the article was constructed were like pieces, i.e. flame-treated pieces were put together and untreated pieces were put together.

Some of these test articles were made using a commercial epoxy resin adhesive marketed under the tradename "Bondmaster M-664" by the Rubber & Asbestos Corporation. Other of these test articles were made using a resorcinol-base resin adhesive marketed under the tradename "Cascophen RS-216" by The Borden Company. Each of these resin adhesives was compounded from an uncured resin-forming material and a curing agent to form a curable composition. The curable composition was applied in a thin layer to the contacting surfaces of the test strip and the test strips were pressed and held together with the adhesive-coated surfaces in contact until the self-curing adhesive cured to a hard set resin.

The strength of the resulting lap-joint bond in each of the composite test articles was tested in a conventional tensile-strength test machine by grasping the free ends of the test strips comprising the composite article, exerting an endwise pull (thereby applying a shear force to the adhesive bond) until some part of the article failed. The results thereby obtained are summarized in the table below, in which the test articles are identified as to whether the contact surfaces of the test pieces therein were untreated surfaces or were flame-treated surfaces. The test articles are also identified as to the kind of resin adhesive used therein. The table also shows the load in pounds per square inch of bond area at which failure occurred, this load being given as a range representing data obtained in replicate tests. The table also shows the locale of failure of the test articles, i.e. as to whether the failure occurred in the bond or in the plastic test piece. Failure shown as "bond" failure signifies that separation took place at the interfacial contact between the surface of the test piece and the resin "adhesive." Failure shown as "plastic" failure indicates that the plastic test piece itself was pulled asunder at the load indicated; in these latter circumstances the load at failure is not a true measure of the bond strength since a force destructive of the bond itself was not attained in such test, but it shows that the bond strength exceeded the strength of the plastic.

Table

| Treatment of Test-piece | Kind of Adhesive Resin [1] | Load at Failure, lb./in.² Bond Area | Type of Failure |
| --- | --- | --- | --- |
| None | M-664 | ² 0 to 10 | bond. |
| None | RS-216 | ² 0 | bond. |
| Flame | M-664 | 95-120 | plastic. |
| Flame | RS-216 | 95-120 | plastic. |

[1] M-664 signifies "Bondmaster M-664"; RS-216 signifies "Cascophen RS-216"
[2] The bond was so weak that failure occurred before a load was registered on the test machine.

We claim:
1. In a method of making composite structures having a thermoset solid resin selected from the class consisting of epoxy resins and phenolic-aldehyde resins securely bonded at a surface of contact with a solid polymer that comprises a major proportion by weight of an alkenylaromatic compound and a minor proportion of at least one polymerizable material selected from the group consisting of conjugated aliphatic dienes and ethylenically unsaturated polymerizable nitriles in polymeric combination, the improvement that comprises contacting a surface of the solid alkenylaromatic polymer with an oxidizing flame without visibly melting that surface, whereby such surface is modified and rendered adherent to a thermoset solid resin, applying to the resulting flame-treated surface an uncured liquide to soft solid curable thermosetting resin-forming composition selected from the class consisting of uncured curable epoxy resin-forming compositions and uncured curable phenolic-aldehyde resin-forming compositions and curing such resin-forming composition while in contact with the flame-treated surface to obtain a solid thermoset resin securely bonded at the surface of contact with the solid alkenylaromatic polymer.

2. The improvement according to claim 1 wherein the solid alkenylaromatic polymer is one that comprises a major proportion by weight of styrene and a minor proportion of at least one polymerizable material selected from the group consisting of conjugated aliphatic dienes and ethylenically unsaturated polymerizable nitriles in polymeric combination.

3. The improvement according to claim 1 wherein the solid alkenylaromatic polymer is one that comprises a major proportion by weight of styrene and a minor portion of a conjugated aliphatic diene copolymer.

4. In a method of making composite structures having a thermoset solid resin selected from the class consisting of epoxy resins and phenolic-aldehyde resins securely bonded to a surface of contact with a solid polymer that comprises a major proportion by weight of an alkenylaromatic compound and a minor proportion of at least one polymerizable material selected from the group consisting of conjugated aliphatic dienes and ethylenically unsaturated polymerizable nitriles in polymeric combination and wherein a surface of the solid alkenylaromatic polymer is briefly contacted with an oxidizing flame whereby such surface is modified and rendered adherent to a themoset solid resin, such contact being terminated before occurrence of visible melting of the polymer surface, the improvement that comprises applying to the resulting modified surface of the solid polymer so flame-treated an uncured liquid to soft solid curable thermosetting resin-forming composition selected from the class consisting of uncured curable epoxy resin-forming compositions and uncured curable phenolic-aldehyde resin-forming compositions and curing such resin-forming composition while in contact with the flame-treated surface to obtain a solid thermoset resin securely bonded at the surface of contact with the solid alkenylaromatic polymer.

5. The improvement according to claim 4 wherein the alkenylaromatic polymer is one that comprises a major proportion by weight of styrene and a minor proportion of at least one polymerizable material selected from the group consisting of conjugated aliphatic dienes and ethylenically unsaturated polymerizable nitriles in polymeric combination.

6. The improvement according to claim 4 wherein the alkenylaromatic polymer is one that comprises a major proportion by weight of styrene and a minor proportion of a conjugated aliphatic diene copolymer.

7. The improvement according to claim 6 wherein the conjugated aliphatic diene copolymer is a copolymer of 1,3-butadiene and styrene.

8. An article of manufacture comprising a composite structure having a thermoset solid resin selected from the class consisting of epoxy resins and phenolic-aldehyde resins securely bonded to a flame-treated surface of a solid polymer that comprises a major proportion by weight of an alkenylaromatic compound and a minor proportion of a polymerizable material selected from the group consisting of conjugated aliphatic dienes and ethylenically unsaturated polymerizable nitriles in polymeric combination, such composite structure having been made by a method comprising the improvement according to claim 4.

9. An article of manufacture comprising a composite structure having a thermoset solid resin selected from the class consisting of epoxy resins and phenolic-aldehyde resins securely bonded to a flame-treated surface of a solid polymer that comprises a major proportion by weight of styrene and a minor proportion of at least one polymerizable material selected from the group consisting of conjugated aliphatic dienes and ethylenically unsaturated polymerizable nitriles in polymeric combination, such composite structure having been made by a method comprising the improvement according to claim 5.

10. An article of manufacture comprising a composite structure having a thermoset solid resin selected from the class consisting of epoxy resins and phenolic-aldehyde resins securely bonded to a flame-treated surface of a solid polymer that comprises a major proportion by weight of styrene and a minor proportion of a conjugated aliphatic diene copolymer, such composite structure having been made by a method comprising the improvement according to claim 6.

11. An article of manufacture comprising a composite structure having a thermoset solid resin selected from the class consisting of epoxy resins and phenolic-aldehyde resins securely bonded to a flame-treated surface of a solid polymer that comprises a major proportion by weight of styrene and a minor proportion of a coplymer of 1,3-butadiene and styrene, such composite structure having been made by a method comprising the improvement according to claim 7.

References Cited in the file of this patent

UNITED STATES PATENTS

| 2,476,282 | Castellan | July 19, 1949 |
| 2,578,770 | Yaeger | Dec. 18, 1951 |
| 2,632,921 | Kreidl | Mar. 31, 1953 |
| 2,648,097 | Kritchever | Aug. 11, 1953 |
| 2,683,894 | Kritchever | July 20, 1954 |
| 2,769,742 | Helbing | Nov. 6, 1956 |

OTHER REFERENCES

"Treating Polyethylene for Printing," Bloyer, Modern Plastics, July 1955, pp. 105, 106, 108 and 205 relied upon.